April 15, 1930.  J. A. STEPHENS  1,755,137
SIGNALING DEVICE
Filed Oct. 4, 1929  2 Sheets-Sheet 1

J. A. Stephens, INVENTOR
BY Victor J. Evans
ATTORNEY

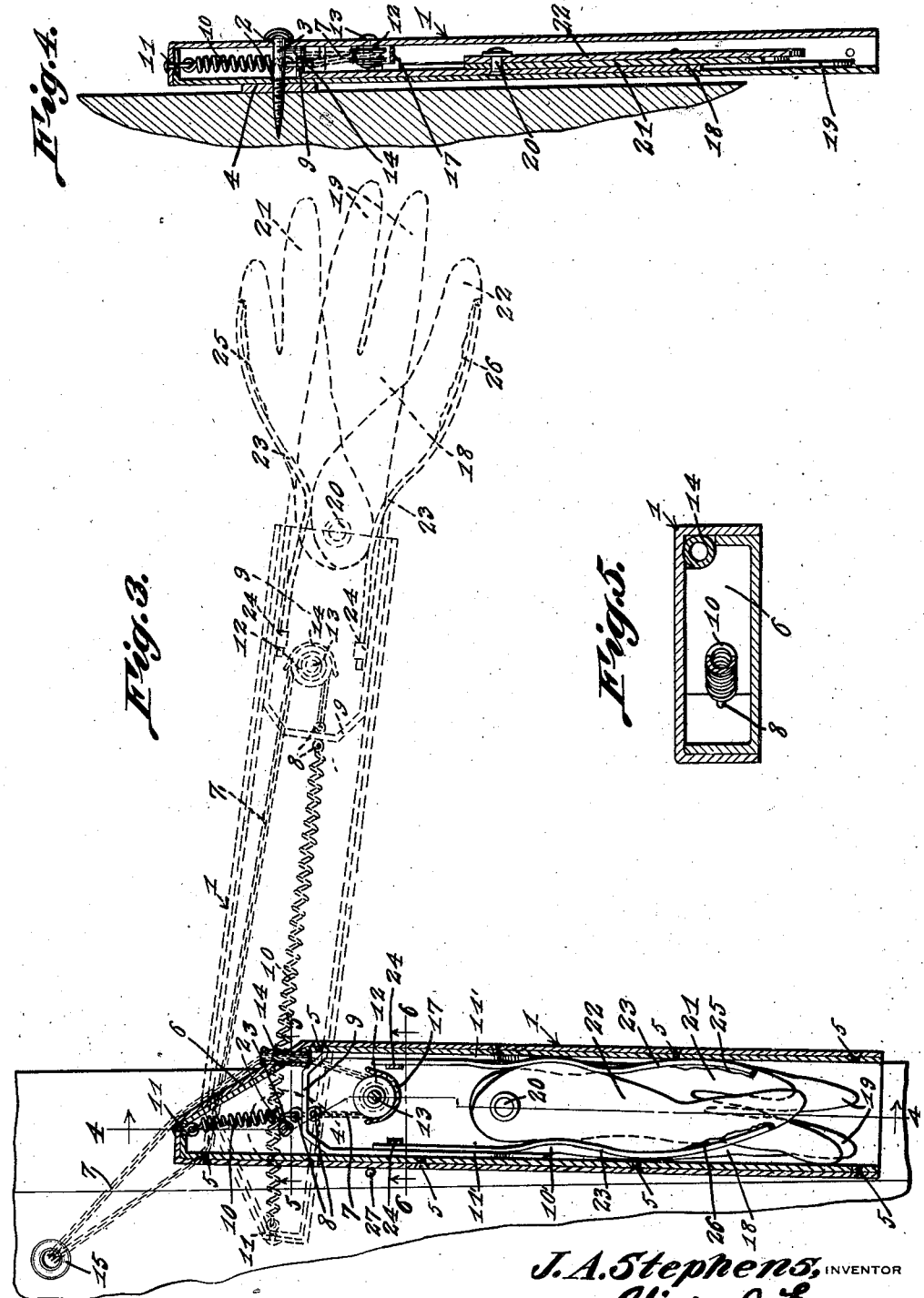

Patented Apr. 15, 1930

1,755,137

UNITED STATES PATENT OFFICE

JOSEPH A. STEPHENS, OF VERMILION, SOUTH DAKOTA

SIGNALING DEVICE

Application filed October 4, 1929. Serial No. 397,344.

This invention relates to improvements in a signal device for automobiles and more particularly to an improvement in that type of signal device which is designed to indicate the driver's intention to make a turn, and one of the principal objects of the invention is to provide a signal device of this type which will be especially well adapted for use on closed cars, the invention contemplating a signal device simulating the human arm and hand, and which device may be conveniently and readily mounted upon the windshield of a closed automobile and actuated by the driver from within the car so as to effect upward and outward swinging of the device, and, simultaneous projection of the arm thereof as a representation of a human arm, the invention in this respect also contemplating a device of this nature in which the parts representing the fingers of the hand are so connected that when the hand member is extended or projected, these parts will automatically be spread apart.

Another object of the invention is to provide a signal device of this type in which the hand member is not only automatically projected from the arm member, but is, at the same time automatically retracted when the arm member is swung downwardly to inactive position.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a vertical transverse sectional view through the device illustrating the same in non-display or inactive position in full lines and in display or active position in dotted lines.

Figure 4 is a vertical transverse sectional view taken substantially on the line 4—4 of Figure 3 looking in the direction indicated by the arrows.

Figure 5 is a horizontal sectional view in detail taken on the line 5—5 of Figure 3 looking in the direction indicated by the arrows.

Figure 1:
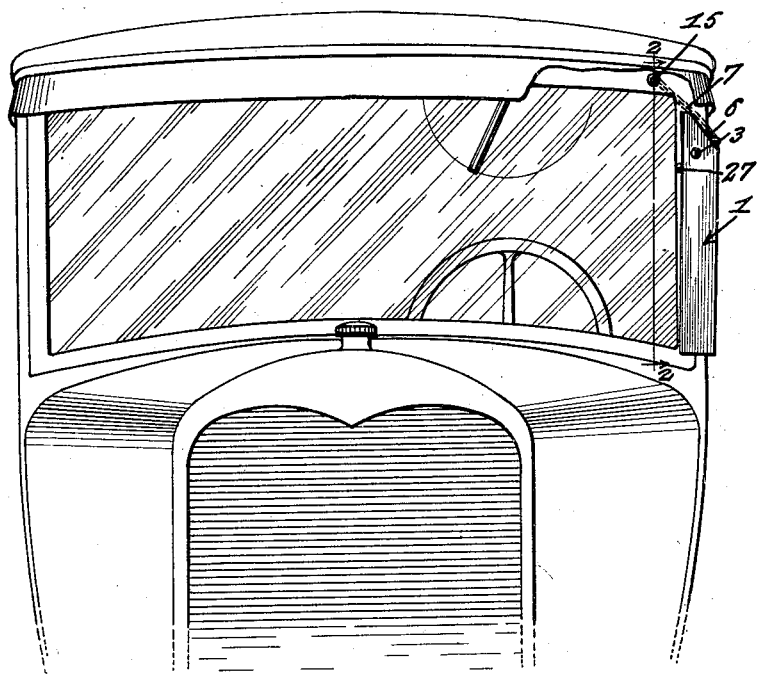
Figure 1 is a view in front elevation of the device embodying the invention mounted upon the windshield of an automobile and in non-display or inactive position.
Figures 2, 6:
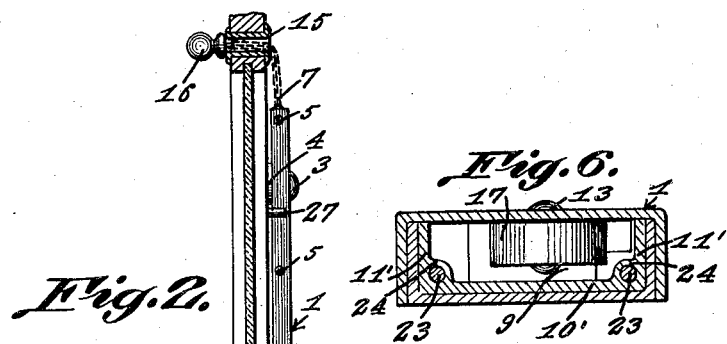
Figure 2 is a vertical sectional view taken on the line 2—2 of Figure 1 looking in the direction indicated by the arrows and illustrating the device of the invention in side elevation.
Figure 6 is a similar view on the line 6—6 of Figure 3.

The signal device comprises a member which is indicated in general by the numeral 1 and which is intended to simulate the human arm. This member may be made of sheet metal, wood, or any other material found suitable for the purpose and is preferably of hollow approximately rectangular tubular form and, in order that the member may be mounted upon one side of the windshield frame, the front and rear walls of the member are provided with openings 2 through which a pivot screw 3 may be engaged and threaded into the said side member of the windshield frame, and a washer 4 being preferably interposed between the rear wall of the member 1 and the said member of the windshield frame, so as to somewhat space the member from the frame and prevent rubbing contact therewith. Preferably the member 1 is formed in two sections which interfit as shown clearly in Figures 3, 5 and 6 of the drawings, and which are held assembled by means of small screws 5, so that access may be had to the interior of the member for the repairs to the parts therein when such become necessary.

The upper end of the member 1 is preferably closed, but the lower end thereof is left open and unobstructed, so that the hand unit of the device may be projected therethrough for display. Furthermore, the said upper end of the member 1, at its side, which will be presented laterally outwardly, is disposed at an angle as indicated by the numeral 6, it being formed in this manner, as will presently be made apparent, to provide for the unobstructed passage of a cable or suitable flexible element through the medium of which the device may be actuated.

The means for effecting outward and upward swinging movement of the arm unit 1 comprises a cable or other flexible element 7 which is connected at one end to one of a pair of mutually connected eyes 8, which are mounted at their connecting portion in the connecting portion of a member 9, which will presently be more fully described, and the tension spring 10 being connected at its lower end to the other eye and at its upper end to an eye 11 anchored in the closed upper end of the unit 1. The flexible element is trained about a pulley 12, which is rotatably mounted upon a spindle 13 extending between and mounted at one end in one of the walls, namely the front wall of the unit body, and from this pulley the cable passes through a tubular guide 14, and upwardly and rearwardly from the upper end of the unit 1 and through an eyeleted opening 15 in the top member of the wind shield frame, a suitable length of the cable being permitted to extend within the automobile beside the frame member upon which the unit 1 is mounted, and being provided with a finger knob 16, whereby it may be conveniently grasped and pulled, thus effecting upward and outward swinging movement of the unit 1, and the hand unit associated therewith, and to be presently described, it being observed that the guide 14 is located laterally outward and beyond the vertical line of the opening 15, this arrangement providing for the desired swinging movement of the device from the vertical to an approximately horizontal position, and the use of a comparatively short cable. Preferably a guard 17 of arcuate form is mounted within the unit 1 to substantially encompass the lower side of the pulley 12 and thus preclude any disengagement of the flexible element from the pulley.

The hand unit of the device comprises the member 9 referred to above and this member comprises a stationary rectangular plate 10' having flanges 11' projecting at right angles from its forward side and at its longitudinal edges and fitted slidably within the body of the member 1 with its flanges slidably engaging against the inner surfaces of the side walls of the said body. The flanges 11' extend over the upper end of the plate 10' to a portion of the plate which constitutes an extension thereof, and which is indicated by the numeral 18, this extension being divided longitudinally so as to provide two finger portions, which are indicated by the numeral 19, and which represent or correspond to the middle finger and forefinger of a human hand.

A pivot 20 is fitted through the plate 10' near the juncture of its extension 18 therewith, and this pivot serves to pivotally connect to the plate, in overlapped relation with respect thereto and with respect to each other, sheet metal members 21 and 22, the member 21 being representative of the little finger and the finger next to it in the instance of a human hand, and the member 22 being representative of the thumb of a human hand. It will be observed by reference to Figure 3 that these members, when they are swung to folded relatively overlapping relation to one another, are all receivable within the body of the unit 1. In order that the members 21 and 22 may be automatically swung outwardly or spread to lie at opposite sides of the member 18 when the hand section is extended as shown in dotted lines in Figure 3, wire springs 23 are arranged at their inner ends against the flanges 11', and are secured in place by short sleeve portions 24 which are struck up from the mid portions of the plate 10 and its flanges 11', these ends of the wire springs being fitted and held in the angle between the plate 10' and the said flanges. The springs are so tensioned that they have a tendency to separate and their forward end portions are soldered or otherwise secured as at 25, one to the outer margin of the little finger element of the member 21 and the other to the outer margin of the thumb representing member 22, the latter being indicated by the numeral 26.

From the foregoing description and by reference to the several figures of the drawings, it will be understood that when a pull is exerted upon the flexible cable 7, the initial pull will result in an upward and outward swinging of the device as a whole and, when a continued pull is exerted upon the cable the plate 9 will be slid longitudinally outwardly in the body of the arm member, the tension of the spring 10 being overcome and the spring being stretched as shown in dotted lines in Figure 3 and, in this movement of the plate the outer margin of the little finger of the hand unit and the corresponding margin of the thumb portion of the unit will ride along the side walls of the body of the member 1 until they move past the open end of the said body whereupon the spring 26 will act to immediately expand or spread these portions, so that they will occupy the positions shown in Figure 3 of the drawings. The driver will maintain his hold upon the cable until he has at least started to make his turn, and, when the turn has been made, he releases his hold upon the cable whereupon the spring 10, contracting, will exert a pull upon the plate 9 to retract the same into the body of the member 1 at the same time causing inward swinging movement of the fingers and thumb of the hand unit so that these members will enter into the hollow body of the arm unit, the arm unit then swinging downwardly to its lowered and inactive position. If it should be desirable or found necessary to eliminate the return movement of the arm unit to its lowered or inactive position, a stop pin 27 may be mounted upon the side of the wind shield to constitute the abutment for the said arm unit.

What I claim is:—

1. In a signal of the class described, a hollow member representative of the human arm, means supporting the same for swinging movement, manually operable means for effecting such swinging movement, a unit representative of a human hand and comprising digit-representing members, the said hand unit being slidably mounted within the hollow member for concealment therein and projection therefrom, and means operably to automatically effect relative spreading of said digit-representing members when the hand unit is projected from the casing.

2. In a signal of the class described, a hollow member representative of a human arm, means supporting the same for swinging movement, manually operable means for effecting such swinging movement, a unit representative of a human hand comprising a member slidable within the hollow member for concealment therein and projection therefrom, members representative of the digits of a human hand pivotally mounted upon said member, and means operating to relatively spread the last mentioned members when the hand unit is projected.

3. In a signal of the class described, a hollow member representative of a human arm, means supporting the same for swinging movement, a unit representative of a human hand and comprising a member slidable within the hollow member for concealment therein and projection therefrom, members representative of the digits of a human hand pivotally mounted upon said member, means operable to relatively spread the digit members when the hand unit is projecting, a tension spring within the arm unit connected at one end to the closed upper end of the arm unit, and at its other end to the first mentioned member of the hand unit, and a flexible pull element connected with the said first mentioned member of the hand unit and extending exteriorly of the arm unit and constituting means for effecting sliding movement of the hand unit to extended position against the tension of said spring.

In testimony whereof I affix my signature.

JOSEPH A. STEPHENS.